United States Patent
Kobayashi

(10) Patent No.: US 11,201,874 B2
(45) Date of Patent: Dec. 14, 2021

(54) INFORMATION PROCESSING APPARATUS, CONTROL METHOD, AND PROGRAM

(71) Applicant: NEC CORPORATION, Tokyo (JP)

(72) Inventor: Yuji Kobayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 292 days.

(21) Appl. No.: 16/370,164

(22) Filed: Mar. 29, 2019

(65) Prior Publication Data

US 2019/0306177 A1 Oct. 3, 2019

(30) Foreign Application Priority Data

Mar. 30, 2018 (JP) .............................. JP2018-069580

(51) Int. Cl.
*H04L 29/06* (2006.01)

(52) U.S. Cl.
CPC .................... *H04L 63/14* (2013.01)

(58) Field of Classification Search
CPC .... H04L 63/14; H04L 63/1408; G06F 21/554
See application file for complete search history.

(56) References Cited

U.S. PATENT DOCUMENTS

| | | | | |
|---|---|---|---|---|
| 9,189,627 | B1* | 11/2015 | Islam | G06F 21/562 |
| 9,537,880 | B1* | 1/2017 | Jones | G06F 21/554 |
| 10,395,029 | B1* | 8/2019 | Steinberg | G06F 9/45541 |
| 2011/0282997 | A1* | 11/2011 | Prince | G06F 16/95 |
| | | | | 709/226 |
| 2016/0050224 | A1* | 2/2016 | Ricafort | H04L 61/2007 |
| | | | | 726/23 |
| 2016/0112451 | A1* | 4/2016 | Jevans | G06F 21/56 |
| | | | | 726/25 |
| 2018/0089430 | A1* | 3/2018 | Mayo | G06F 21/552 |
| 2018/0144139 | A1* | 5/2018 | Cheng | G06F 21/577 |
| 2018/0160309 | A1* | 6/2018 | Turgeman | G06F 21/83 |
| 2018/0191758 | A1* | 7/2018 | Abbaszadeh | H04L 63/1441 |
| 2019/0005235 | A1* | 1/2019 | Klonowski | G06F 21/554 |
| 2019/0007451 | A1* | 1/2019 | Pierce | H04L 63/1425 |
| 2019/0132273 | A1* | 5/2019 | Ryan | H04L 51/12 |
| 2019/0222597 | A1* | 7/2019 | Crabtree | H04L 63/1425 |

(Continued)

FOREIGN PATENT DOCUMENTS

JP 2014-137661 A 7/2014

OTHER PUBLICATIONS

Yoshihiro Oyama et al., "Modularizing Normal Behavior Databases in Anomaly Detection Systems", SIG 10 (ACS 2) Jul. 2003, pp. 36-47, vol. 44.

(Continued)

*Primary Examiner* — Sarah Su
(74) *Attorney, Agent, or Firm* — Sughrue Mion, PLLC

(57) ABSTRACT

An information processing apparatus acquires monitoring data. The monitoring data is data representing an event occurring in the monitoring target system. The information processing apparatus determines whether or not the event represented by the monitoring data is an event to be warned. This determination is made using the determination model. The determination model is a model for determining whether or not the event is a warning target. The information processing apparatus updates the determination model, based on the monitoring data and the result of determination on the monitoring data by using the determination model.

7 Claims, 10 Drawing Sheets

(56) References Cited

U.S. PATENT DOCUMENTS

2020/0067969 A1\* 2/2020 Abbaszadeh .......... G06K 9/6269
2020/0120117 A1\* 4/2020 Hong ................... H04L 63/0254
2020/0279224 A1\* 9/2020 Ma ......................... H04L 9/3247

OTHER PUBLICATIONS

Subutai Ahmad et al., Unsupervised real-time anomaly detection for streaming data, Neurocomputing, Jun. 2017, 000, pp. 1-14.

\* cited by examiner

FIG. 5

| SUBJECT INFORMATION 202 | | OBJECT INFORMATION 204 | | CONTENT INFORMATION 206 |
|---|---|---|---|---|
| PROCESS NAME 208 | PATH 210 | TYPE 212 | IDENTIFICATION INFORMATION 214 | |
| process A | C¥:dir11/dir12/a1.exe | PROCESS | D¥:dir21/dir22/a2.exe | ACTIVATE |
| process B | C¥:dir13/dir14/b1.exe | FILE | D¥:dir23/b2.conf | WRITE |
| process C | C¥:dir15/dir16/c1.exe | APPARATUS | 192.168.24.11 | READ |
| ... | ... | ... | ... | ... |

200

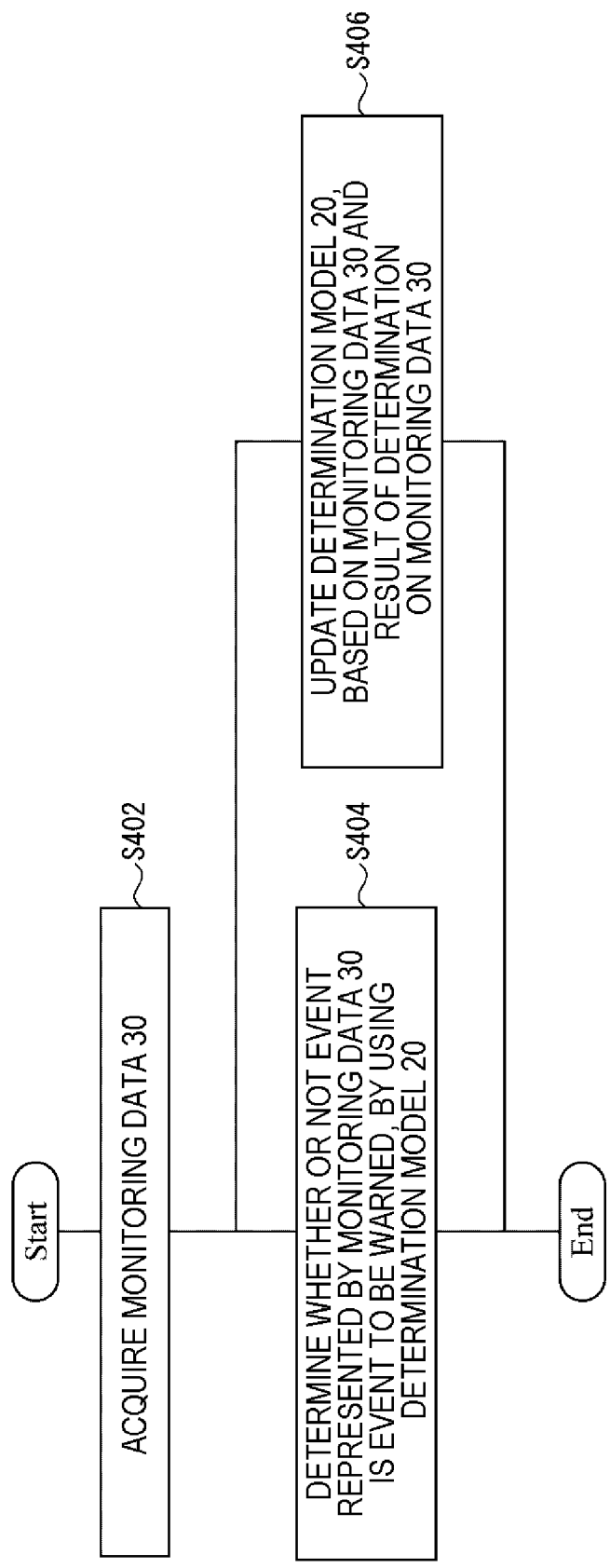

INFORMATION PROCESSING APPARATUS, CONTROL METHOD, AND PROGRAM

BACKGROUND

Technical Field

The invention relates to monitoring of a computer system.

Related Art

From the viewpoint of security, a system for monitoring a computer system has been developed. For example, Japanese Patent Application Publication No. 2014-137661 discloses a system that controls execution of a file in an information terminal apparatus. A server creates a master file list showing files that are confirmed not to have viruses by the virus check. In a case where the acquired file is not included in the master file list, the information terminal apparatus performs a virus check on the file based on a black list.

In addition to this, for example, a system in which attacks such as buffer overflow are avoided by generating normal operation data by modeling the normal operation of the system based on the past operations of the system and detecting abnormality of the system by collation with the normal operation data, is disclosed by Eiko Oyama et al., "Modularization of Normal Operation Data in Abnormality Detection System", Information Processing Society, Information Processing Society Journal Computing Systems (ACS), vol. 44, no. 10, pp. 36-47, July 2003. Here, the system in Oyama et al. creates the normal operation data representing the normal operation of the system, by using a system call issued by the application operated in a training mode.

SUMMARY

With respect to some computer system behaviors, it is not possible to immediately determine whether the behaviors are normal or not. Since the method disclosed in Japanese Patent Application Publication No. 2014-137661 determines whether or not a file is normal by virus check, it is difficult to use this method for monitoring the computer system behavior where it may not be possible to immediately determine whether or not it is normal.

The behavior of the computer system varies depending on the operational environment of the computer system. Thus, according to the method disclosed in Oyama et al., there is a possibility that abnormality cannot be detected in a case where the environment of the system at the time of operation become different from that in the training mode.

The present invention has been made in view of the above problems. An object of the present invention is to provide a technique for accurately monitoring the behavior of a computer system.

In one embodiment, there is provided an information processing apparatus comprising memory storing instructions and at least one processor. The at least one processor is configured to execute the instructions to: acquire monitoring data representing an event; determine whether or not the event represented by the acquired monitoring data is a warning target, the determination being performed using a determination model that is for determining whether or not the event is a warning target; and update the determination model, based on the monitoring data and a result of the determination.

In another embodiment, there is provided a second information processing apparatus comprising memory storing instructions and at least one processor. The at least one processor is configured to execute the instructions to: acquire monitoring data representing an event; determine whether or not the event represented by the acquired monitoring data is a warning target, the determination being performed using a determination model that is for determining whether or not the event is a warning target; update the determination model using the monitoring data; and correct the determination model updated based on the monitoring data, based on a result of the determination.

In a still another embodiment, there is provided a first control method that is executed by a computer. The control method includes: acquiring monitoring data representing an event; determining whether or not the event represented by the acquired monitoring data is a warning target, by using a determination model that is for determining whether or not the event is a warning target; and updating the determination model, based on the monitoring data and a result of the determination.

In a further still another embodiment, there is provided a second control method that is executed by a computer. The control method includes: acquiring monitoring data representing an event; determining whether or not the event represented by the acquired monitoring data is a warning target, by using a determination model that is for determining whether or not the event; updating the determination model using the monitoring data; and correcting the determination model updated based on the monitoring data, based on a result of the determination.

A non-transitory computer-readable storage medium storing a program of the present invention causes a computer to execute each step of the control method of the present invention.

According to the present invention, a technique for accurately monitoring the behavior of a computer system is provided.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 5 is a diagram illustrating information indicated by monitoring data in a table format.

FIG. 10 is a diagram illustrating a flow of updating a determination model by the information processing apparatus of Example Embodiment 2.

DETAILED DESCRIPTION

Figure 1:
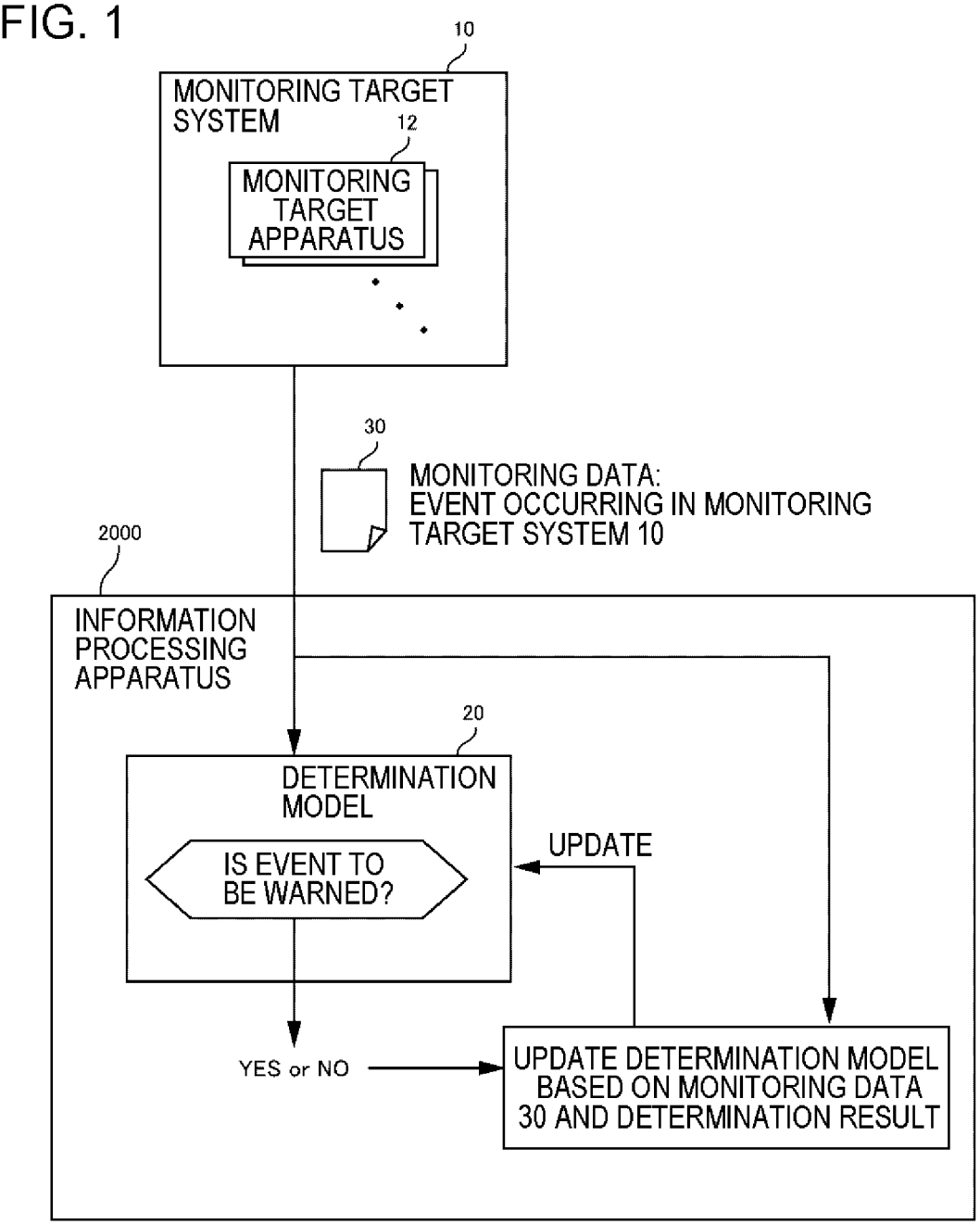
FIG. 1 is a diagram representing an overview of the operation of an information processing apparatus of Example Embodiment 1.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Example Embodiments of the present invention will be described below with reference to the drawings. In all the drawings, the same constituent elements are denoted by the same reference numerals, and the description thereof will not appropriately be repeated. Unless otherwise specified, in each block diagram, each block represents a functional unit configuration, instead of a hardware unit configuration.

Example Embodiment 1

Overview

FIG. 1 is a diagram representing an overview of the operation of an information processing apparatus of Example Embodiment 1. FIG. 1 is a conceptual diagram for facilitating understanding of the operation of an information processing apparatus 2000, and does not specifically limit the operation of the information processing apparatus 2000.

The information processing apparatus 2000 determines whether or not the event occurring in the monitoring target system 10 is an event to be warned. This determination is made using the determination model 20. Further, the information processing apparatus 2000 updates the determination model 20.

The "event" mentioned here represents the behavior of the monitoring target system 10. Examples of the behavior of the monitoring target system 10 include: the behavior of a process in the monitoring target system 10, input from the outside to the monitoring target system 10, and the like. "Process" is a program that is being executed. In other words, "the behavior of a process" is an activity that a process has performed on a certain object (another process, a file, an output device, or the like). Examples of the event generated by a certain process include activation of another process, communication with another process, access to a file, output of data to a network interface (data transmission to an external device), and the like. Examples of the input to the monitoring target system 10 from outside include character input using a keyboard (for example, command input to a shell), input of data from a network interface (reception of data from an external device), and the like.

As the event to be warned, various kinds of event can be adopted. For example, the event to be warned is an event that is presumed to have high security risks, such as an event that is highly likely to be associated with a cyberattack.

The monitoring target system 10 is a computer system configured with one or more apparatuses to be monitored. Each apparatus constituting the monitoring target system 10 is referred to as a monitoring target apparatus 12. It can be said that the event in the monitoring target system 10 represents the behavior of a process operating on the monitoring target apparatus 12 or the input from the outside to the monitoring target apparatus 12. Note that, the monitoring target apparatus 12 may be a physical machine or a virtual machine.

First, the information processing apparatus 2000 acquires the monitoring data 30. The monitoring data 30 is data representing an event occurring in the monitoring target system 10. The information processing apparatus 2000 determines whether or not the event represented by the monitoring data 30 is an event to be warned. As described above, this determination is made using the determination model 20. For example, the determination model 20 is a discriminator that acquires the monitoring data 30 as an input and outputs information indicating whether or not the event represented by the monitoring data 30 is a target of warning (a warning target).

Further, the information processing apparatus 2000 updates the determination model 20 based on the monitoring data 30 and the result of determination on the monitoring data 30 by using the determination model 20.

Advantageous Effect

For some events occurring in the computer system, it is difficult to determine whether or not they are normal when they occur only once. Thus, it is preferable to continuously monitor the events occurring in the computer system.

Therefore, the information processing apparatus 2000 according to the present embodiment prepares a determination model 20 for determining whether or not an event occurring in the monitoring target system 10 is a warning target, and repeatedly updates the determination model 20. By repeatedly learning the events occurring in the monitoring target system 10 in this manner, it becomes possible to accurately determine whether or not each event is to be set as a warning target.

In addition, in a case where the operational environment of the monitoring target system changes (for example, an organization at a company is changed), the tendency of event occurrence changes and this results in the change of whether it is normal or not for each event. According to the information processing apparatus 2000 of the present example embodiment, even in a case where the operational environment of the monitoring target system 10 changes in this way, the determination model 20 is updated according to the change. Thus, for example, even if the operational environment of the system changes due to the change in organization at the company, it is possible to accurately determine whether or not each event is to be handled as a warning target.

Here, it is disclosed that in a system that analyzes time-series input data in real time to detect abnormality, the system continues to perform learning, by S. Ahmad et al., "Unsupervised real-time anomaly detection for streaming data", Neurocomputing, vol. 262, pp. 134-147, 2017. In this regard, in the information processing apparatus 2000, the inventor of the present invention has found that events to be remained as a warning target could become not to be a warning target when just continuously updating the determination model 20 based only on the contents of the input monitoring data 30. For example, suppose that the determination model 20 is configured so as to determine an event with the smaller number of occurrences or with lower occurrence frequency in the monitoring target system 10, as a warning target. In this case, as will be described later, if an event to be remained as a warning target (for example, an event related to malware) repeatedly occurs, this event become not determined as a warning target.

Therefore, in the information processing apparatus 2000 of the present example embodiment, the determination model 20 is updated in consideration of not only the contents of the monitoring data 30 but also the result of determination on the monitoring data 30 performed by the information processing apparatus 2000 (whether or not the event represented by the monitoring data 30 is a warning target). By considering not only what event has occurred but also how the event is determined by the information processing apparatus 2000, it is possible to make events to be remained as a warning target remain as warning target, and therefore it is possible to more accurately update the determination model 20.

Hereinafter, the information processing apparatus 2000 of the present example embodiment will be described in more detail.

Example of Functional Configuration of Information Processing Apparatus 2000

Figure 2:
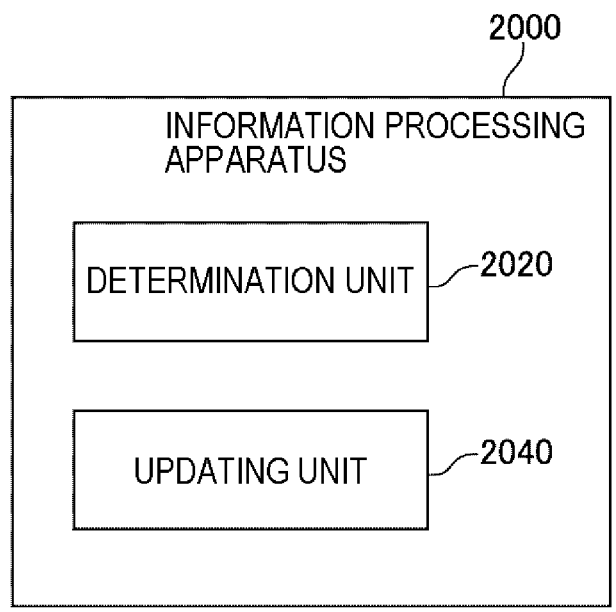
FIG. 2 is a diagram illustrating the configuration of the information processing apparatus of Example Embodiment 1.

FIG. 2 is a diagram illustrating the configuration of the information processing apparatus 2000 of Example Embodiment 1. The information processing apparatus 2000 includes a determination unit 2020 and an updating unit 2040. The determination unit 2020 acquires the monitoring data 30 and determines whether or not the event represented by the monitoring data 30 is an event to be warned, by using the determination model 20. The updating unit 2040 updates the determination model 20, based on the monitoring data 30 and the determination result on the monitoring data 30 by the determination unit 2020.

Hardware Configuration of Information Processing Apparatus 2000

Each functional configuration unit of the information processing apparatus 2000 may be realized by hardware (for example, a hard-wired electronic circuit) that realizes each functional configuration unit, or a combination of hardware and software (for example, a combination of an electronic circuit, a program for controlling the electronic circuit, and the like). Hereinafter, the case where each functional configuration unit of the information processing apparatus 2000 is realized by a combination of hardware and software will be further described.

Figure 3:
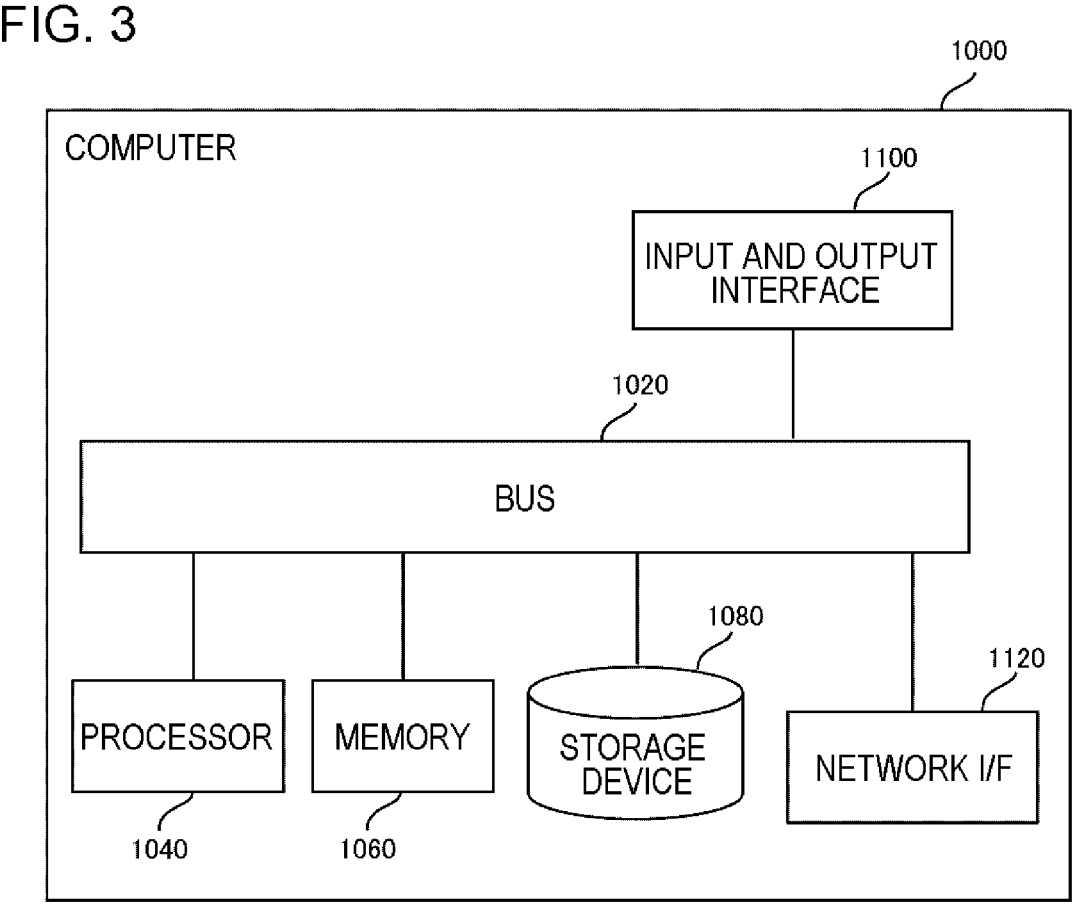
FIG. 3 is a diagram illustrating a computer for realizing the information processing apparatus.

FIG. 3 is a diagram illustrating the computer 1000 for realizing the information processing apparatus 2000. The computer 1000 is any types of computer. For example, the computer 1000 is a personal computer (PC), a server machine, a tablet terminal, a smartphone, or the like. The computer 1000 may be a special purpose computer designed to realize the information processing apparatus 2000 or may be a general purpose computer.

The computer 1000 includes a bus 1020, a processor 1040, a memory 1060, a storage device 1080, an input and output interface 1100, and a network interface 1120. The bus 1020 is a data transmission path through which the processor 1040, the memory 1060, the storage device 1080, the input and output interface 1100, and the network interface 1120 mutually transmit and receive data. However, a method of connecting the processor 1040 and the like to each other is not limited to bus connection. The processor 1040 is a processor such as a central processing unit (CPU), a graphics processing unit (GPU), a field-programmable gate array (FPGA), or the like. The memory 1060 is a primary storage device realized by using a random access memory (RAM) or the like. The storage device 1080 is a secondary storage device realized by using a hard disk drive, a solid state drive (SSD), a memory card, a read only memory (ROM), or the like. However, the storage device 1080 may be configured with the same hardware as the hardware constituting the primary storage device, such as a RAM.

The input and output interface 1100 is an interface for connecting the computer 1000 and an input and output device. The network interface 1120 is an interface for connecting the computer 1000 to a communication network. The communication network is, for example, a local area network (LAN) or a wide area network (WAN). The method by which the network interface 1120 connects to the communication network may be a wireless connection or a wired connection.

The storage device 1080 stores program modules that realize the functional configuration units of the information processing apparatus 2000. The processor 1040 reads these respective program modules into the memory 1060 and executes them, thereby realizing the respective functions corresponding to the respective program modules.

Regarding Monitoring Target System 10

The monitoring target system 10 is a computer system composed with one or more computers. The computer constituting the monitoring target system 10 is any types of computer such as a PC, a server machine, a tablet terminal, and a smartphone.

Process Flow

Figure 4:
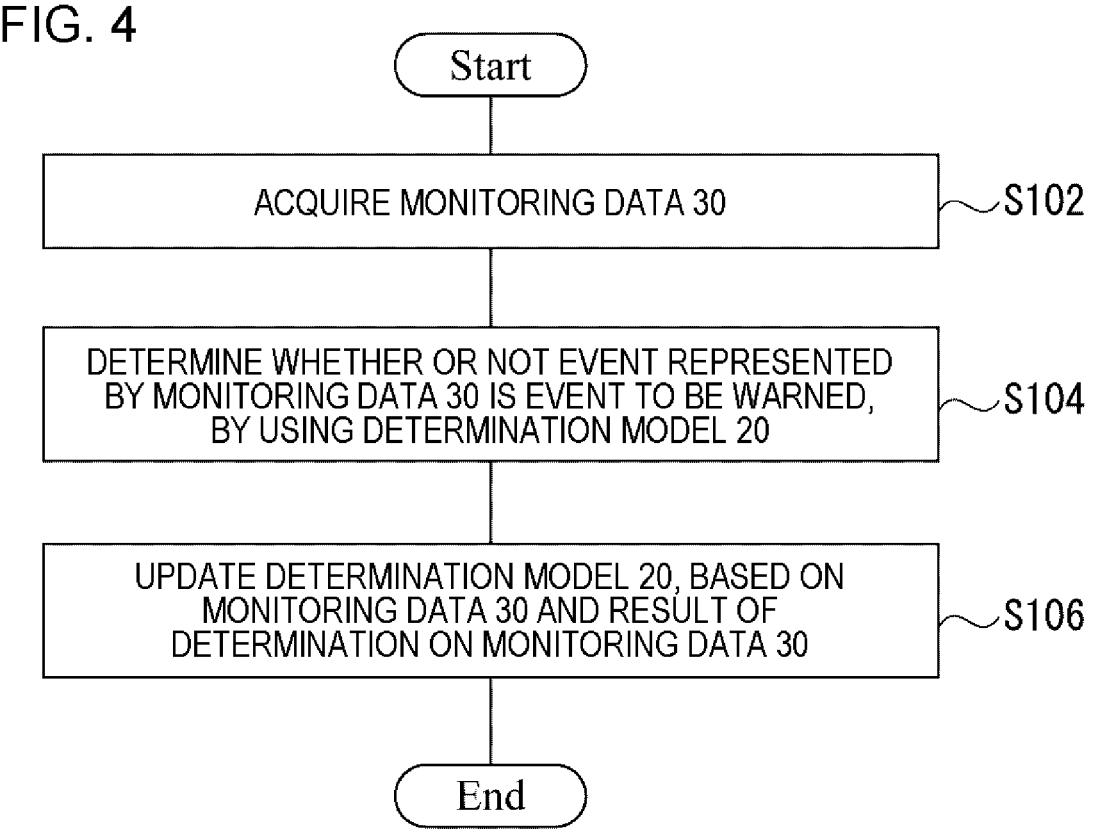
FIG. 4 is a flowchart illustrating a flow of a process performed by the information processing apparatus of Example embodiment 1.

FIG. 4 is a flowchart illustrating the flow of a process executed by the information processing apparatus 2000 of Example Embodiment 1. The determination unit 2020 acquires monitoring data 30 (S102). The updating unit 2040 determines whether or not the event represented by the monitoring data 30 is an event to be warned, by using the determination model (S104). The updating unit 2040 updates the determination model 20, based on the monitoring data 30 and the result of determination on the monitoring data 30 by the determination unit 2020 (S106).

As to Monitoring Data 30

The monitoring data 30 indicates information representing an event. As described above, the event is the behavior of the monitoring target system 10 (the behavior of a process or an input from an outside). Note that, with respect to the behavior of a process, in a case where a certain process runs with another process as an object, these processes may operate on the same operating system (OS) or on different OSes. As an example of the latter, for example, it is conceivable that a certain process communicates with another process running on a different OS by using a socket interface. However, the behavior of a process whose object is another process running on a different OS may be represented as an output to an output device (for example, a network interface).

For example, an event is identified by information representing three elements: a subject; an object; and an activity content. Therefore, the monitoring data 30 represents an event by showing a combination of subject information representing the subject of the event, object information representing the object of the event, and content information representing the activity contents.

The subject information is, for example, information for identifying a process or an input device that has generated the event. Hereinafter, information for identifying a process is referred to as process identification information, and information for identifying a device is referred to as device identification information. The process identification information indicates, for example, the name of the process. In another example, the process identification information is the name or path of the executable file of the program corresponding to the process, the process ID (identifier), and the like. For example, the device information represents an identifier assigned by the OS to the device.

The object information is, for example, the type and identification information of the object. The type of the object is, for example, process, file, output device, or other monitoring target apparatus 12. When the object is a process, the object information includes the process identification information of the process.

When the object is a file, the object information includes information for identifying the file (hereinafter referred to as file identification information). The file identification information is, for example, the name or path of the file. Further, when the object is a file, the object information may include a hash value of the file.

When the object is an output device, the object information includes the device identification information of the device.

In a case where the object is other monitoring target apparatus 12, for example, the object information includes identification information of the monitoring target apparatus 12. The identification information of the monitoring target apparatus 12 is, for example, a network address such as Internet Protocol (IP) address or Media Access Control (MAC) address. Note that, in a case where the object is other monitoring target apparatus 12, the object information may indicate the number of objects (i.e. the number of the monitoring target apparatuses 12 that communicates with a process of the subject of the event), together with or instead of the identification information of the monitoring target apparatus 12.

The content information is, for example, an identifier that is assigned in advance to each of various activity contents. For example, different identifiers are assigned to the activity contents such as "start a process", "stop a process", "open a file", "read data from a file", "write data into a file", "open a socket", "read data from a socket, and "write data into a socket". Note that, an access to a socket means an access to another monitoring target apparatus 12 associated with the socket.

FIG. 5 is a diagram illustrating information indicated by monitoring data 30 in a table format. The table in FIG. 5 is referred to as a table 200. The table 200 includes subject information 202, object information 204, and content information 206. The subject information 202 includes a process name 208 and a path 210. The object information 204 includes a type 212 and identification information 214.

For generation of the monitoring data 30, any technique for recording an event occurring in a computer can be used. For example, each monitoring target apparatus 12 has a function of generating the monitoring data 30 for an event when the event occurs. For example, the monitoring target apparatus 12 stores the monitoring data 30 in a storage device also accessible from the information processing apparatus 2000, and transmits the monitoring data 30 to the information processing apparatus 2000.

Acquisition of Monitoring Data 30: S102

The determination unit 2020 acquires monitoring data 30 (S102). The determination unit 2020 acquires monitoring data 30 in various ways. For example, the determination unit 2020 acquires the monitoring data 30 from the storage device in which the monitoring data 30 is stored. This storage device may be provided outside the information processing apparatus 2000 or may be provided therein. In addition, for example, the determination unit 2020 may receive the monitoring data 30 transmitted from another apparatus (for example, the monitoring target apparatus 12).

As to Determination Model 20

The determination model 20 will be described here. First of all, it is considered that an event that rarely occurs is a remarkable event. This is because an event occurring frequently is highly likely to be a normal event, while an event that rarely occurs is highly likely to be an abnormal event. For example, events related to cyberattacks such as malware (file access by malware, or the like) rarely occur compared with events generated by ordinary processes.

Therefore, the determination model 20 handles an event with the smaller number of occurrences or with lower occurrence frequency in the monitoring target system 10 as an event to be warned, whereas it handles an event with the larger number of occurrences or with higher occurrence frequency in the monitoring target system 10 as an event not to be warned. To do so, for example, the determination model 20 is configured with 1) a score based on the number of occurrences or occurrence frequency of each event, and 2) a threshold value. The score is determined for each event.

Whether or not the event is a warning target is determined by comparing the score of the event with the threshold value. When the score of the event is equal to or less than the threshold value, the determination model 20 determines that the event is a warning target. On the other hand, when the score of the event is larger than the threshold value, the determination model 20 determines that the event is not a warning target.

The score of each event is updated by updating the determination model 20 by various methods described later. Note that, for the event occurring first in the monitoring target system 10, a score with the initial value is assigned. The initial value of the score can be an arbitrary value. The initial value of the score may be common to all the events or may be different for each event. For example, it is conceivable to make the initial values of the scores different depending on the subject of the event or the type of the object.

Update of Determination Model 20: S106

The updating unit 2040 updates the determination model 20, based on the monitoring data 30 and the result of determination on the monitoring data 30 by the determination model 20. Here, as described above, basically, the determination model 20 handles an event with the smaller number of occurrences or with lower occurrence frequency in the monitoring target system 10 as an event to be warned, whereas it handles an event with the larger number of occurrences or with higher occurrence frequency in the monitoring target system 10 as an event not to be warned. As a simple method to realize this, there is a method of increasing the score of the event every time an event occurs. By doing this, the event score increases as the number of occurrences of events increases.

However, according to this method, if an event that is determined as a warning target repeatedly occurs, it will eventually become not to be determined as to be warned. However, some events should remain a warning target even if they repeatedly occurs. Examples of such an event include events related to cyberattacks.

Therefore, the updating unit 2040 updates the score of the event in the determination model 20, in consideration of not only the fact that an event has occurred but also how the event is determined by the determination model 20. A specific example of the method will be illustrated below.

Example 1 of Updating Method

Figure 6:
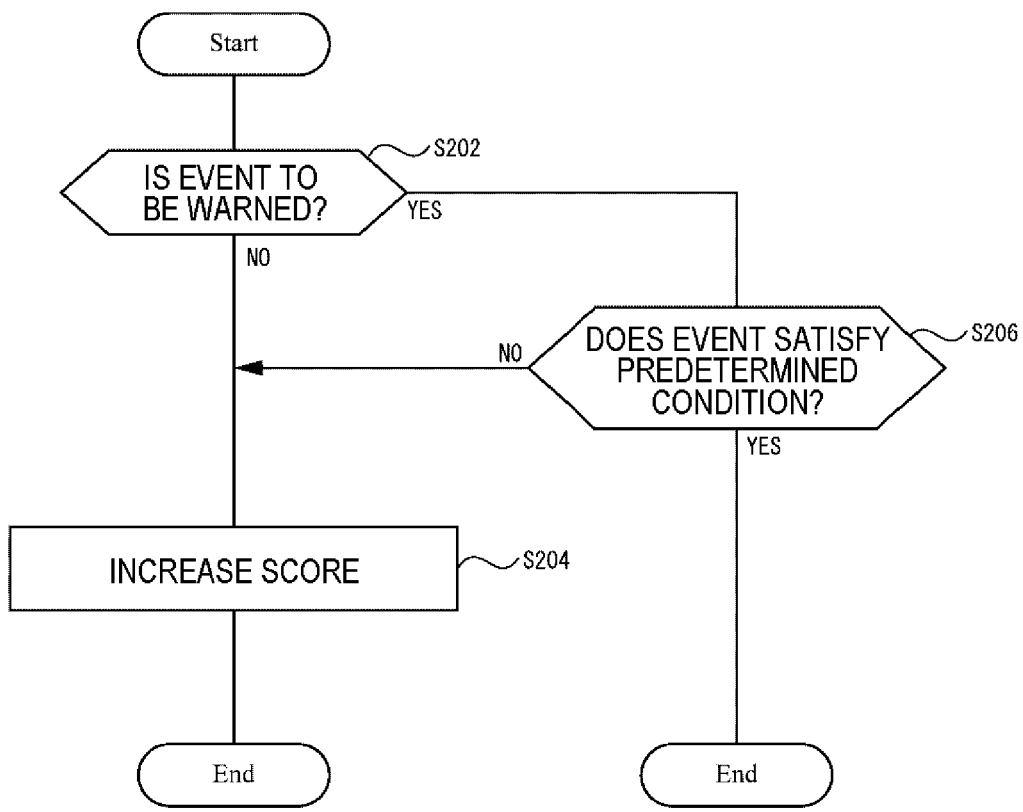
FIG. 6 is a flowchart illustrating a flow of Example 1 of an updating method.

The updating unit 2040 does not necessarily increase the score for the event represented by the monitoring data 30, and does not increase the score in some cases. FIG. 6 is a flowchart illustrating a flow of Example 1 of the updating method.

In a case where the event represented by the monitoring data 30 is determined as not to be warned by the determination unit 2020 (S202: NO), the updating unit 2040 increases the score of the event in the determination model 20 (for example, the predetermined value is added) (S204).

On the other hand, in a case where the event represented by the monitoring data 30 is determined as to be warned by the determination unit 2020 (S202: YES), the updating unit 2040 determines whether or not the event satisfies a predetermined condition (for example, condition related to a cyberattack) (S206). When the predetermined condition is not satisfied (S206: NO), the updating unit 2040 increases the score of the event in the determination model 20 (S204).

On the other hand, when the predetermined condition is satisfied (S206: YES), the updating unit 2040 does not increase the score of the event in the determination model 20 (the process in FIG. 6 ends). Here, "not to increase the score" may be realized by a method of executing a process of adding zero to the score, or may be realized by a method of not executing the process of changing the score. The former case means that the monitoring data 30 representing the event satisfying the predetermined condition is input to the process (for example, a function) of changing the score, and the increase amount of the score is zero. On the other hand, the latter case means that the monitoring data 30 representing the event satisfying the predetermined condition is not input to the process of changing the score.

From the above description, in this example, in a case where the event represented by the monitoring data 30 is determined as to be warned by the determination unit 2020 and the event satisfies the predetermined condition, the score of the event in the determination model 20 is not increased. Otherwise, the score of the event in determination model 20 is increased. By doing so, with respect to events satisfying a predetermined condition, such as being related to a cyberattack, the score thereof in the determination model 20 is not increased, and the score thereof remains not exceeding the threshold value. Thus, such an event can be continuously handled as a warning target.

Here, the increase amount of the score may be common to all the events, or may be different for each event. In the latter case, for example, weights are given to the elements of the event. Further, a default increase amount common to all events is defined. The updating unit 2040 determines the increase amount of the score of the event, based on the default increase amount and the weight attached to the element of the event. For example, the updating unit 2040 sets a value obtained by multiplying the default increase amount by the weight attached to the element of the event as the increase amount of the score of the event.

The weights to be attached to the elements of the event may be attached to respective elements of the event or may be attached to a combination of elements. For example, if there is a program which is known in advance that it hardly runs, a weight larger than 1 is attached to the subject indicating the program. If there is a program which is known in advance that it hardly performs file access, a weight larger than 1 is attached to the combination "the subject is the program, and the activity content is the file access".

The updating unit 2040 recognizes the weights of the elements of the event in various methods. For example, the updating unit 2040 assumes that information on weights be included in the monitoring data 30. In this case, the updating unit 2040 can recognize the weight attached to the element of the event by referring to the monitoring data 30. In another example, information indicating weights in association with the elements of the event or a combination thereof (hereinafter referred to as weight information) may be stored in the storage device. In this case, the updating unit 2040 recognizes the weight of the element of the event by accessing the storage device.

Note that, the weight attached to the element of the event may be changed at an arbitrary timing. In this way, even if the same event occurs, the increase amount of the score will change according to the weight from time to time. For example, suppose that the information on the weight is included in the monitoring data 30. In this case, even if the monitoring data 30 acquired at different timings indicate the same event, the weight attached to the element of the event in the acquired monitoring data 30 may be different from each other. Similarly, the contents of the weight information stored in the storage device vary depending on the access timing.

Example 2 of Updating Method

Figure 7:
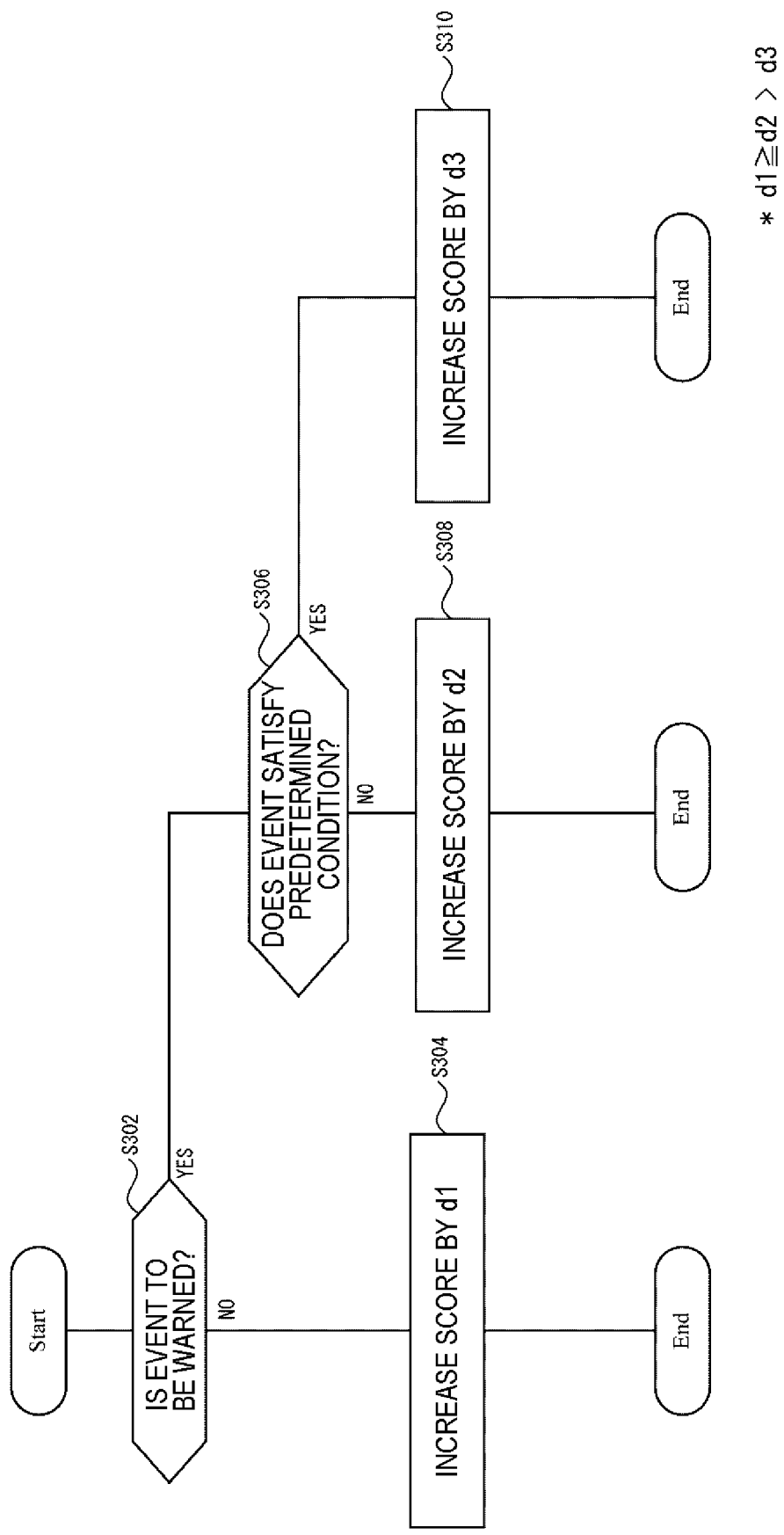
FIG. 7 is a flowchart illustrating a flow of Example 2 of the updating method.

The updating unit 2040 increases the score for the event represented by the monitoring data 30 with a different increase amount depending on the situation. FIG. 7 is a flowchart illustrating a flow of Example 2 of the updating method.

For example, in a case where the determination unit 2020 determines that the event represented by the monitoring data 30 is not a warning target (S302: NO), the updating unit 2040 increases the score of the event by d1 (S304). In a case where the determination unit 2020 determines that the event represented by the monitoring data 30 is a warning target (S302: YES), and the event does not satisfy the predetermined condition (S306: NO), the updating unit 2040 increases the score of the event by d2 (S308). Further, in a case where the determination unit 2020 determines that the event represented by the monitoring data 30 is a warning target (S302: YES), and the event satisfies the predetermined condition (S306: YES), the updating unit 2040 increases the score of the event by d3 (S310). In this case, at least d3 is set to a value smaller than d1 or d2. That is, "d1>=d2>d3" is satisfied. The values of the increase amounts of the scores are stored in advance in the storage device accessible from the updating unit 2040.

According to the above method, with respect to events satisfying a predetermined condition, such as being related to a cyberattack, among the events determined to be warning targets, the score is hardly increased, compared with other events. Thus, it is possible to increase the probability that events satisfying such predetermined conditions will continue to be handled as warning targets.

Note that, when the score is increased by each of the above-mentioned methods, the score may be increased after multiplying the current score by a predetermined value less than 1. By doing this, the score emphasizes the most recent situation.

Note that, as described in "Example 1 of updating method", the increase amount of the score may be determined in consideration of the weight. In this case, the increase amounts d1 to d3 of the score are used as the default value of the increase amount of the score. The updating unit 2040 determines which value of d1 to d3 the default value of the score is to be set, and then determines the increase amount of the score by multiplying the determined value by the above-described weight.

Regarding Predetermined Conditions

As described above, for the event that is determined to be a warning target and satisfies a predetermined condition, the score of the event in the determination model 20 is not increased or the increase amount of the score is relatively small. For example, the predetermined condition is a condition "an event related to a predetermined program". For example, by setting a predetermined program as a program related to a cyberattack such as malware, it is possible to create a predetermined condition of "the event is an event related to a cyberattack".

Here, "an event related to a predetermined program" means, for example, an event at least one of whose subject or object is a predetermined program, an event whose object is data generated by a predetermined program, or the like. In addition, for example, 1) an event occurring in the monitoring target apparatus 12 in which a predetermined program runs, 2) an event occurring in a different monitoring target apparatus 12 communicating with a predetermined program, 3) an event related to another program that reads the data generated by a predetermined program, 4) an event related to another program that has activated a predetermined program, 5) an event occurring in any monitoring target apparatus 12 before, after, or in a time period when a predetermined program runs, or the like may be handled as "an event related to a predetermined program".

The number of predetermined programs may be one or plural. Information defining a predetermined program (for example, the name of a program or the name of an executable file) is stored in a storage device accessible from the updating unit 2040.

Output of Warning

It is preferable that the administrator or the like of the monitoring target system 10 can recognize that the event to be warned has occurred, in a case where the event represented by the monitoring data 30 is determined to be warned. Therefore, for example, the information processing apparatus 2000 outputs predetermined warning information, in a case where the event represented by the monitoring data 30 is determined to be warned.

Various types of information may be used as warning information. For example, the warning information is a string, image, voice, or the like for notifying that an event to be warned has occurred. Note that, it is preferable that the warning information includes information (subject information, object information, and content information) for determining the event determined to be a warning target.

Various output destinations may be used for warning information. For example, the warning information is output to a computer used by an administrator or the like of the monitoring target system 10. The computer may be a computer installed fixedly (such as a desktop PC) or a portable computer (a portable terminal or the like). Further, the warning information may be transmitted to the administrator or the like of the monitoring target system 10. In this case, for example, the warning information is transmitted by e-mail or the like to the administrator or the like of the monitoring target system 10.

In addition, for example, the warning information may be stored in a storage device accessible from a computer used by the administrator or the like of the monitoring target system 10. More specifically, in the storage device, a log file is prepared in advance that is used to record information on the events to be warned. The information processing apparatus 2000 adds information on the event to the log file, in a case where it is determined that the event represented by the monitoring data 30 is an event to be warned. The computer used by the administrator or the like of the monitoring target system 10 can acquire information on an event to be warned that has occurred in the monitoring target system 10 by referring to the log file.

Example Embodiment 2

Figure 8:
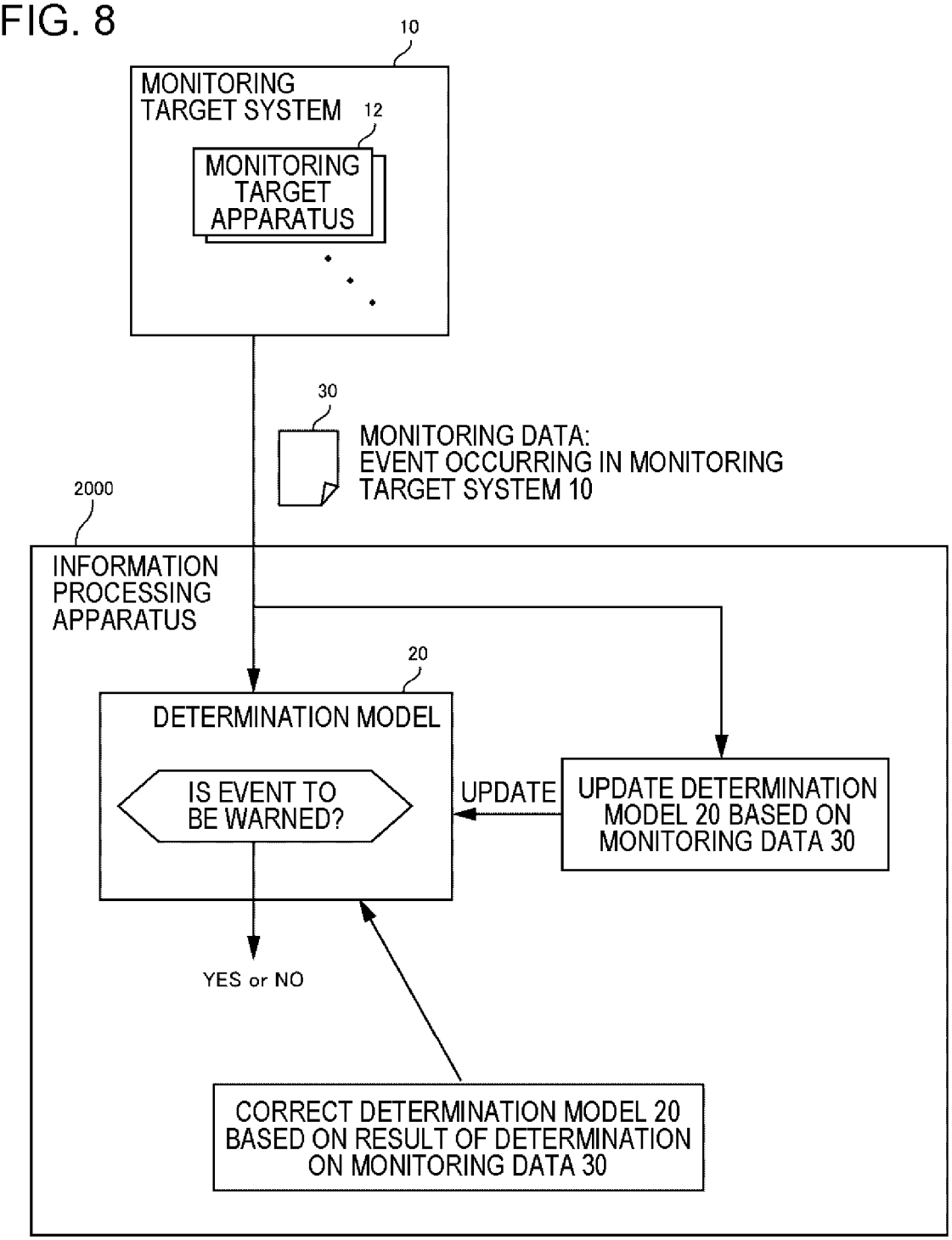
FIG. 8 is a diagram representing an overview of the operation of an information processing apparatus of Example Embodiment 2.

FIG. 8 is a diagram representing an overview of the operation of an information processing apparatus 2000 of Example Embodiment 2. FIG. 8 is a conceptual diagram for facilitating understanding of the operation of an information processing apparatus 2000, and does not specifically limit the operation of the information processing apparatus 2000.

Similarly to the information processing apparatus 2000 of Example Embodiment 1, the information processing apparatus 2000 of Example Embodiment 2 determines whether or not the event occurring in the monitoring target system 10 is to be warned, by using the determination model 20. However, the update of the determination model 20 is performed differently from the information processing apparatus 2000 of Example Embodiment 1. This point will be described below.

First, the information processing apparatus 2000 of Example Embodiment 2 updates the determination model 20 based on the acquired monitoring data 30. This update does not use the result of determination on whether or not the event represented by the monitoring data 30 is to be warned. Thus, the information processing apparatus 2000 updates the determination model 20 asynchronously with the determination on whether or not the event represented by the monitoring data 30 is to be warned. In this way, comparing to the information processing apparatus 2000 of Example Embodiment 1, the information processing apparatus 2000 of Example Embodiment 2 can quickly complete the update of the determination model 20.

However, after updating the determination model 20, the information processing apparatus 2000 of Example Embodiment 2 corrects the determination model 20 as necessary, based on the result of the determination on whether or not the event represented by the monitoring data 30 is to be warned. That is, the information processing apparatus 2000 performs an operation of "updating the determination model 20 first, and then correcting the determination model 20 later as necessary". By correcting the determination model 20 in this way, it is possible to make the determination criterion (that is, the score) of the determination model 20 in the information processing apparatus 2000 of Example Embodiment 2 equal to that of the determination model 20 in Example Embodiment 1.

The above-mentioned method of correcting the determination model 20 is suitable for a case where an event occurs frequently in the monitoring target system 10, for example. This is because in a case where an event frequently occurs, if the determination model 20 is updated every time the event occurs, the computation load applied to the information processing apparatus 2000 by the updating process of the determination model 20 could increase, and this affects a process of determining whether or not the event is a warning target. Specifically, there could be an effect that the time required for the determination process becomes long. According to the information processing apparatus 2000 of the example embodiment, it is possible to prevent such an influence from occurring.

Example of Functional Configuration

Figure 9:
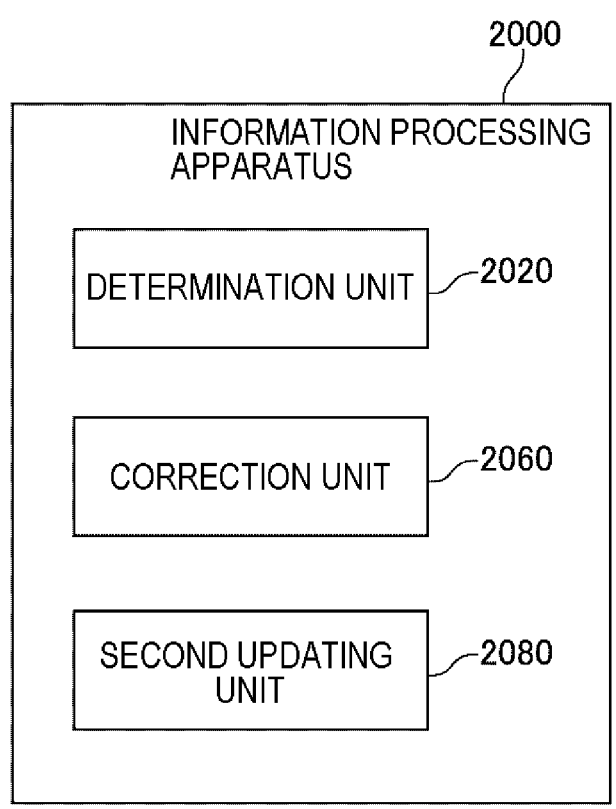
FIG. 9 is a diagram illustrating a functional configuration of the information processing apparatus of Example Embodiment 2.

FIG. 9 is a diagram illustrating the functional configuration of the information processing apparatus 2000 of Example Embodiment 2. The information processing apparatus 2000 of Example Embodiment 2 includes a determination unit 2020, a second updating unit 2080, and a correction unit 2060. The determination unit 2020 acquires the monitoring data 30 and determines whether or not the event represented by the monitoring data 30 is a warning target, by using the determination model 20. The second updating unit 2080 updates the determination model using the monitoring data 30. The correction unit 2060 corrects the determination model updated based on the monitoring data 30, based on the result of determination on the event represented by the monitoring data 30 that is performed by the determination unit 2020.

Example of Hardware Configuration

A hardware configuration of a computer that implements the information processing apparatus 2000 of Example Embodiment 2 is illustrated in FIG. 3, for example, as in Example Embodiment 1. However, in the storage device 1080 of the computer 1000 that implements the information processing apparatus 2000 of the present example embodiment, a program module that implements the functions of the information processing apparatus 2000 according to the present example embodiment is further stored.

Process Flow

FIG. 10 is a diagram illustrating a flow of updating a determination model 20 by the information processing apparatus 2000 of Example Embodiment 2. The information processing apparatus 2000 acquires the monitoring data 30 (S402). The determination unit 2020 determines whether or not the event represented by the monitoring data 30 is to be warned, using the determination model 20 (S404). The second updating unit 2080 updates the determination model 20 using the monitoring data 30 (S406).

Further, the correction unit 2060 corrects the determination model 20. Here, the timing at which the correction unit 2060 corrects the determination model 20 may be any timing. For example, the correction unit 2060 periodically (for example, once a day) corrects the determination model 20.

As to Method of Updating and Correcting Determination Model 20

A specific example of the method of updating and correcting the determination model will be described in comparison with the method of updating the determination model 20 in Example Embodiment 1.

Example 1 of Correction Method

For example, in Example Embodiment 1, for the event that is determined not to be an event to be warned by the determination unit 2020 and satisfies the predetermined condition, the updating unit 2040 does not increase the score of the event in the determination model 20. The information processing apparatus 2000 of Example Embodiment 2 realizes the same thing by correcting the determination model 20. To do so, for example, the second updating unit 2080 and the correction unit 2060 operate as follows.

First, the second updating unit 2080 increases the score of the event in the determination model 20, for the event represented by the monitoring data 30. Here, the determination result by the determination unit 2020 is not taken into account. Thus, different from the case of Example Embodiment 1, the score of "an event that is determined to be warned by the determination unit 2020 and also satisfies a predetermined condition" is also increased.

However, after that, the correction unit 2060 corrects the determination model 20 so as to cancel the increase in the score of "an event that is determined to be warned by the determination unit 2020 and also satisfies a predetermined condition". For example, the correction unit 2060 extracts an event represented by the monitoring data 30 which is determined to be a warning target, among the monitoring data 30 used for each update performed after a time when the determination model 20 is corrected last time. Further, the correction unit 2060 determines whether or not the event satisfies a predetermined condition (see Example Embodiment 1) for each extracted monitoring data 30. In a case where the event satisfies the predetermined condition, the correction unit 2060 corrects the determination model 20 by decreasing the score of the event. For example, in a case where the second updating unit 2080 has increased the score of the event by d, the correction unit 2060 decreases the score of the event by d.

Example 2 of Correction Method

For example, in Example Embodiment 1, the updating unit 2040 increases the score for the event represented by the monitoring data 30 with a different increase amount depending on the situation. The information processing apparatus 2000 of Example Embodiment 2 realizes the same thing by correcting the determination model 20. To do so, for example, the second updating unit 2080 and the correction unit 2060 operate as follows. Note that, it is assumed that the increase amount of the score is d1, d2, or d3, as described in FIG. 7.

First, the second updating unit 2080 increases the score of the event in the determination model 20 by d1, for the event represented by the monitoring data 30. Here, since the result of determination by the determination unit 2020 and the like are not taken into consideration, the increase amount of the score is fixed to d1.

However, after that, the correction unit 2060 corrects the score of the event that is determined to be warned by the determination unit 2020. For example, the correction unit 2060 extracts an event represented by the monitoring data 30 which is determined to be a warning target, among the monitoring data 30 used for each update performed after a time when the determination model 20 is corrected last time. Further, the correction unit 2060 determines whether or not the event satisfies a predetermined condition (see Example Embodiment 1) for each extracted monitoring data 30. In a case where the event satisfies the predetermined condition, the correction unit 2060 decreases the score of the event by (d1−d3). On the other hand, in a case where the event does not satisfy the predetermined condition, the correction unit 2060 decreases the score of the event by (d1−d2). Note that, in a case of d1=d2, the latter correction is not required.

Other Correction Method of Determination Model 20

The method of correcting the determination model 20 is not limited to the method of changing the score value as described above. For example, when it is necessary to correct the determination model 20, the correction unit 2060 may cancel at least a part of the update of the determination model 20, and may cause the updating unit 2040 of Example Embodiment 1 to update the determination model 20 again. In this case, the information processing apparatus 2000 of Example Embodiment 2 includes an updating unit 2040 in addition to the second updating unit 2080.

Hereinafter, more specific description will be made. The correction unit 2060 determines the monitoring data 30 which is acquired after a time when the determination model is corrected last time and is acquired at the earliest time, among pieces of the monitoring data determined to be warned by the determination unit 2020. Here, it can be said that the updating to the determination model 20 before this time is not required to be corrected.

First, the correction unit 2060 changes the current determination model 20 to the determination model 20 at the determined time. Further, the correction unit 2060 causes the updating unit 2040 to update the determination model 20, based on respective pieces of monitoring data 30 acquired after the determined time and the result of determination on the respective pieces of monitoring data 30 by the determination unit 2020. By doing so, the updating of the determination model 20 performed by the second updating unit 2080 after the determined time is canceled, and the updating by the updating unit 2040 is applied instead.

Note that, in order to realize this method, it is necessary to store the change history of the determination model 20 in the storage device. For example, the second updating unit 2080 stores the determination model 20 before change in the storage device, before updating the determination model 20.

However, not all of the change history of the determination model 20 may be stored, but only a part thereof may be stored. For example, the determination model 20 at that time is stored in the storage device at predetermined time intervals. In this case, the correction unit 2060 replaces the current determination model 20 with the newest determination model 20 that does not require correction, in terms of the history of the determination model 20 stored in the storage device. The updating unit 2040 updates the determination model 20, based on respective pieces of monitoring data 30 acquired after a time when the determination model 20 is stored and the result of determination on the respective pieces of monitoring data 30 by the determination unit 2020.

The correction method of causing the updating unit 2040 to perform updating again in this way, for example, it is useful in a case where a weight for the increase amount of the score is attached to the event element and the weight changes. In this case, the score changed when the second updating unit 2080 updates the determination model 20 depends on the weight attached to the event at that time. Thus, rather than correcting the score value by the method shown in "Example 1 of Correction Method" or "Example 2 of Correction Method", the process becomes easier if the learning is performed again.

Although the example embodiments of the present invention have been described with reference to the drawings, these are examples of the present invention, and it is possible to adopt a combination of the above respective example embodiments, or various other configurations.

All or some of the above example embodiments may be listed also in the following notes, but not limited thereto.

1. An information processing apparatus comprising memory storing instructions and at least one processor,
    wherein the at least one processor is configured to execute the instructions to:
    acquire monitoring data representing an event;
    determine whether or not the event represented by the acquired monitoring data is a warning target, the determination being performed using a determination model that is for determining whether or not the event is a warning target; and
    update the determination model, based on the monitoring data and a result of the determination.

2. The information processing apparatus according to 1.,
    wherein the determination model holds a score for each event, and determines that the event is a warning target in a case where the score of the event represented by the monitoring data is equal to or less than a threshold value,
    the at least one processor is further configured to:
    determine whether or not the event satisfies a predetermined condition, in a case where the event represented by the monitoring data is determined to be a warning target;
    increase the score of the event in the determination model both of when the event represented by the monitoring data is determined not to be a warning target, and when the event represented by the monitoring data is determined not to satisfy the predetermined condition; and
    not increase the score of the event in the determination model when the event represented by the monitoring data is determined to satisfy the predetermined condition.

3. The information processing apparatus according to 1.,
    wherein the determination model holds a score for each event, and determines that the event is a warning target in a case where the score of the event represented by the monitoring data is equal to or less than a threshold value,
    the at least one processor is further configured to:
    increase the score of the event indicated by the determination model, for the event represented by the monitoring data;
    determine whether or not the event satisfies a predetermined condition in a case where the event represented by the monitoring data is determined to be a warning target; and
    in a case where the event satisfies the predetermined condition, increase the score of the event with an increase amount smaller than in a case where the event does not satisfy the predetermined condition.

4. The information processing apparatus according to 2. or 3., wherein the predetermined condition is a condition that the event is related to a cyberattack.

5. An information processing apparatus comprising memory storing instructions and at least one processor,
    wherein the at least one processor is configured to execute the instructions to:
    acquire monitoring data representing an event;
    determine whether or not the event represented by the acquired monitoring data is a warning target, the determination being performed using a determination model that is for determining whether or not the event is a warning target;
    update the determination model using the monitoring data; and
    correct the determination model updated based on the monitoring data, based on a result of the determination.

6. The information processing apparatus according to 5., wherein the at least one processor is further configured to periodically correct the determination model.

7. The information processing apparatus according to 5. or 6.,
    wherein the determination model holds a score for each event, and determines that the event is a warning target in a case where the score of the event represented by the monitoring data is equal to or less than a threshold value, and
    the at least one processor is further configured to:
    update the determination model by increasing the score of the event represented by the monitoring data;
    determine whether or not the event satisfies a predetermined condition in a case where the event represented by the monitoring data is determined to be a warning target; and
    in a case where the event satisfies the predetermined condition, change the score of the event so as to reduce the score of the event by an amount increased by update based on the monitoring data.

8. The information processing apparatus according to 5. or 6., wherein the at least one processor is further configured to:
determine the monitoring data that is acquired at an earliest time, among pieces of the monitoring data that are acquired after the determination model is corrected last time and are determined to be a warning target,
replace the determination model currently used with the determination model at the time when the determined monitoring data is acquired, and
update the determination model, based on the monitoring data that is acquired after the determined monitoring data is acquired and a result of the determination.

9. A control method executed by a computer, comprising:
acquiring monitoring data representing an event;
determining whether or not the event represented by the acquired monitoring data is a warning target, by using a determination model that is for determining whether or not the event is a warning target; and
updating the determination model, based on the monitoring data and a result of the determination.

10. The information processing apparatus according to 9.,
wherein the determination model holds a score for each event, and determines that the event is a warning target in a case where the score of the event represented by the monitoring data is equal to or less than a threshold value, and
the method further comprises:
determining whether or not the event satisfies a predetermined condition, in a case where the event represented by the monitoring data is determined to be a warning target;
increasing the score of the event in the determination model both of when the event represented by the monitoring data is determined not to be a warning target, and when the event represented by the monitoring data is determined not to satisfy the predetermined condition; and
not increasing the score of the event in the determination model when the event represented by the monitoring data is determined to satisfy the predetermined condition.

11. The information processing apparatus according to 9.,
wherein the determination model holds a score for each event, and determines that the event is a warning target in a case where the score of the event represented by the monitoring data is equal to or less than a threshold value, and
the method further comprises:
increasing the score of the event indicated by the determination model, for the event represented by the monitoring data;
determining whether or not the event satisfies a predetermined condition in a case where the event represented by the monitoring data is determined to be a warning target; and
in a case where the event satisfies the predetermined condition, increasing the score of the event with an increase amount smaller than in a case where the event does not satisfy the predetermined condition.

12. The control method according to 10. or 11., wherein the predetermined condition is a condition that the event is related to a cyberattack.

13. A control method executed by a computer, the method including:
acquiring monitoring data representing an event;
determining whether or not the event represented by the acquired monitoring data is a warning target, by using a determination model that is for determining whether or not the event;
updating the determination model using the monitoring data; and
correcting the determination model updated based on the monitoring data, based on a result of the determination.

14. The control method according to 13., further comprising periodically correcting the determination model.

15. The control method according to 13. or 14.,
wherein the determination model holds a score for each event, and determines that the event is a warning target in a case where the score of the event represented by the monitoring data is equal to or less than a threshold value, and
the method further comprises:
updating the determination model by increasing the score of the event represented by the monitoring data;
determining whether or not the event satisfies a predetermined condition in a case where the event represented by the monitoring data is determined to be a warning target; and
in a case where the event satisfies the predetermined condition, changing the score of the event so as to reduce the score of the event by an amount increased by update based on the monitoring data.

16. The control method according to 13. or 14., further comprising:
determining the monitoring data that is acquired at an earliest time, among pieces of the monitoring data that are acquired after the determination model is corrected last time and are determined to be a warning target,
replacing the determination model currently used with the determination model at the time when the determined monitoring data is acquired, and
updating the determination model, based on the monitoring data that is acquired after the determined monitoring data is acquired and a result of the determination.

17. A non-transitory computer-readable storage medium storing a program that causes a computer to execute each step of the control method according to any one of 9. to 16.

It is apparent that the present invention is not limited to the above embodiment, and may be modified and changed without departing from the scope and spirit of the invention.

This application claims the benefit of priority from Japanese Patent Application No. 2018-069580 filed on Mar. 30, 2018, the entire disclosure of which is incorporated herein.

What is claimed is:

1. An information processing apparatus comprising memory storing instructions and at least one processor,
wherein the at least one processor is configured to execute the instructions to:
acquire monitoring data representing an event;
determine whether or not the event represented by the acquired monitoring data is a warning target, the determination being performed using a determination model that is for determining whether or not the event is a warning target; and
update the determination model, based on the monitoring data and a result of the determination,
wherein the determination model holds a score for each event, and determines that the event is a warning target in a case where the score of the event represented by the monitoring data is equal to or less than a threshold value, and
wherein the at least one processor is further configured to:
determine whether or not the event satisfies a predetermined condition, in a case where the event represented by the monitoring data is determined to be a warning target;
increase the score of the event in the determination model both of when the event represented by the monitoring data is determined not to be a warning target, and when the event represented by the monitoring data is determined not to satisfy the predetermined condition; and not increase the score of the event in the determination model when the event represented by the monitoring data is determined to satisfy the predetermined condition.

2. The information processing apparatus according to claim 1, wherein the predetermined condition is a condition that the event is related to a cyberattack.

3. An information processing apparatus comprising memory storing instructions and at least one processor,
wherein the at least one processor is configured to execute the instructions to:
acquire monitoring data representing an event;
determine whether or not the event represented by the acquired monitoring data is a warning target, the determination being performed using a determination model that is for determining whether or not the event is a warning target;
update the determination model using the monitoring data; and
correct the determination model updated based on the monitoring data, based on a result of the determination,
wherein the determination model holds a score for each event, and determines that the event is a warning target in a case where the score of the event represented by the monitoring data is equal to or less than a threshold value, and
wherein the at least one processor is further configured to:
update the determination model by increasing the score of the event represented by the monitoring data;
determine whether or not the event satisfies a predetermined condition in a case where the event represented by the monitoring data is determined to be a warning target; and
in a case where the event satisfies the predetermined condition, change the score of the event so as to reduce the score of the event by an amount increased by updating the determination model by increasing the score of event represented by the monitoring data.

4. The information processing apparatus according to claim 3, wherein the at least one processor is further configured to periodically correct the determination model.

5. A control method executed by a computer, comprising:
acquiring monitoring data representing an event;
determining whether or not the event represented by the acquired monitoring data is a warning target, by using a determination model that is for determining whether or not the event is a warning target; and
updating the determination model, based on the monitoring data and a result of the determination,
wherein the determination model holds a score for each event, and determines that the event is a warning target in a case where the score of the event represented by the monitoring data is equal to or less than a threshold value, and
wherein the control method further comprises:
determining whether or not the event satisfies a predetermined condition, in a case where the event represented by the monitoring data is determined to be a warning target;
increasing the score of the event in the determination model both of when the event represented by the monitoring data is determined not to be a warning target, and when the event represented by the monitoring data is determined not to satisfy the predetermined condition; and
not increasing the score of the event in the determination model when the event represented by the monitoring data is determined to satisfy the predetermined condition.

6. A non-transitory computer-readable storage medium storing a program that causes a computer to execute each step of the control method according to claim 5.

7. A control method executed by a computer, comprising:
acquiring monitoring data representing an event;
determining whether or not the event represented by the acquired monitoring data is a warning target, by using a determination model that is for determining whether or not the event;
updating the determination model using the monitoring data; and
correcting the determination model updated based on the monitoring data, based on a result of the determination,
wherein the determination model holds a score for each event, and determines that the event is a warning target in a case where the score of the event represented by the monitoring data is equal to or less than a threshold value, and
wherein the control method further comprises:
updating the determination model by increasing the score of the event represented by the monitoring data;
determining whether or not the event satisfies a predetermined condition in a case where the event represented by the monitoring data is determined to be a warning target; and
in a case where the event satisfies the predetermined condition, changing the score of the event so as to reduce the score of the event by an amount increased by updating the determination model by increasing the score of event represented by the monitoring data.

* * * * *